Figure 1:
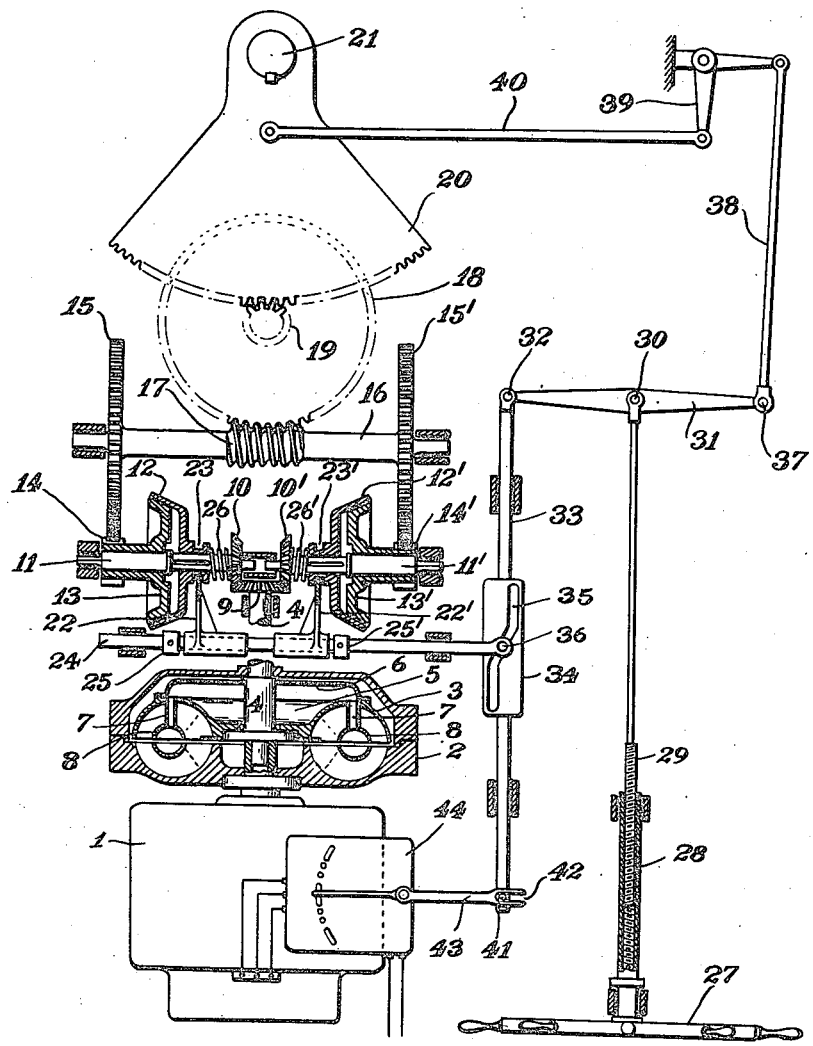

Sept. 5, 1939.   H. SINCLAIR   2,171,715
REVERSING GEAR MECHANISM
Filed May 3, 1937   3 Sheets-Sheet 2

Inventor
Harold Sinclair

Sept. 5, 1939.　　　　H. SINCLAIR　　　　2,171,715
REVERSING GEAR MECHANISM
Filed May 3, 1937　　　3 Sheets-Sheet 3

Patented Sept. 5, 1939

2,171,715

UNITED STATES PATENT OFFICE 2,171,715

REVERSING GEAR MECHANISM

Harold Sinclair, London, England

Application May 3, 1937, Serial No. 140,280
In Great Britain May 8, 1936

7 Claims. (Cl. 74—189.5)

The present invention relates to reversing gear mechanism especially but not exclusively applicable to the operation of ship's steering gears, submarine controls, and like mechanisms having an element such as a rudder, which has to be moved one way or the other at will.

A known steering gear for ships comprises a driving motor coupled by bevel gearing to two co-axial shafts, the gearing being so arranged that these shafts are constrained to rotate oppositely. Each of these shafts is coupled by a friction clutch to a pinion, and the pinions each mesh with a gearwheel keyed to a common worm shaft. A worm wheel meshing with the worm is fixed to the shaft of a pinion meshing with a toothed sector coupled to the rudder post. The clutches are normally both disengaged and the motor runs continuously. To turn the rudder, one or other of the clutches is engaged, and the sector is caused to turn until the engaged clutch is disengaged by the action of a differential mechanism ("hunting gear") connected between the sector, the clutch actuating mechanism and the control wheel.

With such an arrangement, when the rudder is moved, the clutches have to accelerate the stationary gearing by coupling it to the rotating driving gearing; they therefore work under arduous conditions in the case of steering gears of large size.

Objects of the present invention are to provide an improved method of obtaining a reversible drive, and to provide reversing gear mechanism applicable to servo controls, which is sensitive and rapid in response, and which is nevertheless capable of running for long periods without attention.

According to the present invention, a method of deriving, from a continuously rotating driving member, forward and reverse rotations of a driven member, consists in generating forward and reverse torques by means of the hydraulic drag acting between hydrokinetic coupling elements, applying these torques simultaneously to said driven member through forward- and reverse-drive friction clutches respectively, and thereafter disengaging one or other of said friction clutches to cause said driven member to rotate in the forward or in the reverse direction respectively.

Reversing gear mechanism according to the present invention comprises a driving member adapted to rotate continuously in one direction, a driven member, and two friction clutches arranged in parallel with their driving elements connected to said driving member and their driven elements connected to said driven member, the arrangement being such that, when power is transmitted by the one or the other of said clutches, the driven member rotates in the one or the other direction respectively, characterised by at least one hydraulic coupling of the kinetic type provided between said driving member and said driven member in series with said friction clutches, and by control means adapted normally to maintain in both of said clutches engaged, and operable to disengage them alternatively.

The improved mechanism may include only one hydraulic coupling, having its impeller element connected to the driving member and its runner element connected to the driving elements of both of the friction clutches.

Figure 2:
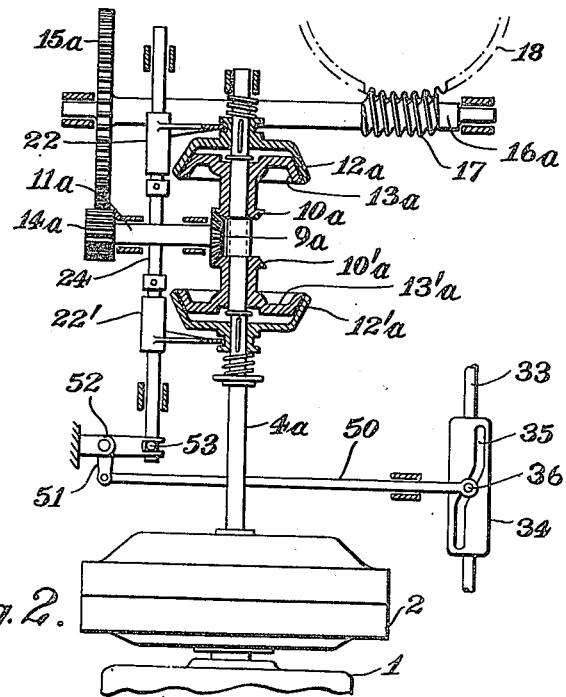
Figure 3:
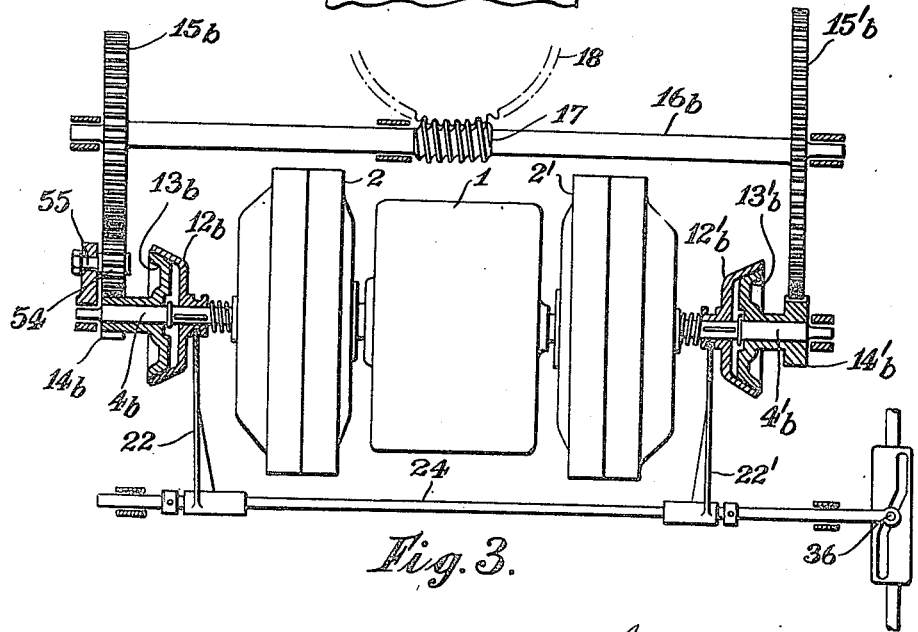
Figure 4:
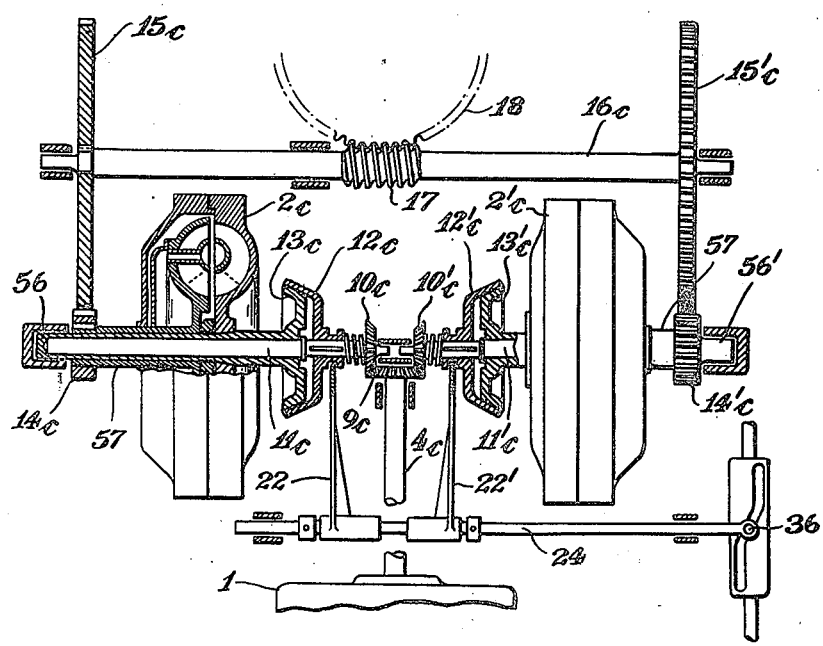

In the accompanying drawings Fig. 1 is a diagrammatic plan view of one example of the improved mechanism, as applied to a ship's steering gear, Figs. 2, 3 and 4 show parts of alternative arrangements in accordance with the invention. The parts not shown in these drawings are similar to the corresponding parts shown in Fig. 1.

In Fig. 1 a shunt-controlled direct-current motor 1, which constitutes the driving member of the system, is directly connected to the impeller 2 of a hydraulic coupling of the kinetic type. The coupling here shown is of my known "traction" type having a rotary reservoir and means for automatically transferring part of the working liquid thereto when the driven part is stalled. This coupling includes a runner 3 fixed to a driven shaft 4; and a rotating reservoir 5, formed between the back of the runner and a dished casing 6 fixed thereto, communicates with the working circuit by ducts 7 opening within a core guide member 8.

The driven shaft 4 drives distributing gearing comprising a bevel gear wheel 9 fixed to the shaft 4 and meshing with two co-axial bevel gear wheels 10 and 10' fixed respectively to shafts 11 and 11', which are thus constrained to rotate oppositely whenever the shaft 4 rotates. Two friction clutches have driving elements 12 and 12' slidable on and keyed to the shafts 11 and 11' respectively, and driven elements 13 and 13' fixed to pinions 14 and 14' journalled on the shafts 11 and 11' respectively. These pinions mesh respectively with gear wheels 15 and 15' keyed to a common driven member consisting of a shaft 16 having cut thereon a worm 17 meshing with a worm wheel 18. A pinion 19 is fixed to the shaft of the worm wheel 18 and meshes with a toothed sector 20 coupled to a rudder post 21. It will be evident that the above-mentioned parts 10 to 15 are effectively in parallel with the parts 10' to 15'.

The friction clutches are actuated by yokes 22 and 22' engaged in grooves 23 and 23' in the driving elements 12 and 12'. These yokes are slidably mounted on a slidable rod 24, between two collars 25 and 25' fixed to the rod. Springs 26 and 26' normally keep both friction clutches engaged.

A steering wheel 27 is fixed to an internally screw-threaded hollow shaft 28 engaged with a screw 29 which is pivotally connected at 30 to a floating lever 31. One end of this lever is pivotally connected at 32 to a slidable rod 33 to which is fixed a cam plate 34 having a cam slot 35 in which is engaged a follower pin 36 fixed to the clutch-actuating rod 24. The cam slot is so shaped that initial displacement of the rod 33 one side or the other of its neutral position serves to displace the rod 24 one side or the other respectively from its neutral position, while further displacement of the rod 33 in the same direction does not move the rod 24. The other end of the floating lever is pivotally connected at 37 to a link 38 coupled by a bell-crank lever 39 and a link 40 to the sector 20.

The slidable rod 33 carries a pin 41 engaged in a fork 42 formed in the control arm 43 of a shunt-regulator 44 associated with the motor 1. The regulator is so arranged that, when the arm 43 is in its mid position, as shown, the motor 1 runs at its lowest speed. Movement of the arm to either side of the mid position has the same effect, namely, on initial movement of the arm the motor speed remains unchanged; over a further part of the range of movement the motor is accelerated, and over the end part of the range, the motor runs at maximum speed.

This device operates as follows. When the rudder is stationary, the shunt-regulator 44 keeps the motor 1 idling at say 300 or 400 R. P. M. in a clockwise direction as viewed from the bottom of the drawings and both friction clutches are engaged. The slip in the hydraulic coupling is thus 100 per cent. and substantial equal and opposite torques are applied through the two friction clutches to the shaft 16, which under these conditions is locked against rotation.

If the steering wheel 27 is now turned, say clockwise as viewed from the bottom of the drawings, its initial movement moves the floating lever 31 anti-clockwise about the pivot 37 and thus lowers the rod 33. The cam 34 draws the rod 24 to the right, with the result that the collar 25 engages the yoke 22 and disengages the clutch 12, 13, while the clutch 12', 13' remains engaged; further small movement of the steering wheel moves the arm 43 of the shunt-regulator far enough to accelerate the motor 1. As soon as the clutch 12, 13 is disengaged the clutch 12', 13' rotates, owing to the torque load acting upon it, and causes the rudder to turn clockwise. The follow-up linkage 40, 39, 38 now causes the floating lever 31 to move clockwise about the pivot 30, until the cam 34 returns the rod 24 to its neutral position, with the result that the motor is first retarded and thereafter the clutch 12, 13 is re-engaged so that the quadrant 20 is locked in the desired new position and overrun is obviated.

This arrangement has the following advantages. The worm shaft 16 is always under torsional load so that the rudder responds with the least possible delay. The power used to move the rudder is transmitted through a friction clutch that is already engaged, hence there is no wear of the friction surfaces during acceleration of the rudder. When the disengaged clutch is re-engaged to bring the rudder to rest, the braking action which it causes is assisted by the prior slowing down of the motor under the full strength of its field and also by the friction in the gearing and the load imposed by the rudder; whereas in the known arrangement the friction clutches have to overcome the resistance due to both friction and the load. Furthermore the new arrangement gives a more precise control by eliminating the overrun due to inertia of the known type of clutch and gear mechanism.

In the modification shown in Fig. 2, the driven shaft 4a of the hydraulic coupling carries the two friction clutches. Their driving elements 12a and 12'a, actuated by yokes 22 and 22', are slidably keyed on the shaft 4a, and their driven elements 13a and 13'a are journalled on the shaft 4a and fixed respectively to bevel gear wheels 10a and 10'a meshing with a common driven wheel 9a fixed to a driven shaft 11a. A pinion 14a fixed to the shaft 11a meshes with a gear wheel 15a fixed to the worm shaft 16a. The yokes are mounted on a slidable rod 24 having a pin 53 engaged with one arm of a bell-crank lever 51 pivoted on a fixed bracket 52. The other arm of the lever 51 is pivoted to a slidable link 50 to which is fixed the cam follower pin 36. This arrangement operates similarly to that described with reference to Fig. 1.

In the arrangement shown in Fig. 3 the motor 1 drives the impellers 2 and 2' of two hydraulic couplings the runners of which are fixed to driven shafts 4b and 4'b. Friction clutch driving elements 12b and 12'b are slidably keyed on the shafts 4b and 4'b respectively and co-operate respectively with driven elements 13b and 13'b journalled on these shafts. The element 13b is fixed to a pinion 14b meshing with an idler wheel 54 journalled on a fixed pin 55. The wheel 54 meshes with a wheel 15b fixed to the worm shaft 16b. The clutch driven element 13'b is fixed to a pinion 14'b meshing with a gear wheel 15'b fixed to the worm shaft 16b. The ratios of this gearing are such that, whenever the shaft 16b is rotated, the elements 13b and 13'b are constrained to rotate at equal speeds in opposite directions.

When both the friction clutches are engaged, the slip in both the hydraulic couplings is 100 per cent. and a balanced torque load exists in the stationary mechanical gearing. If one of the friction clutches, for instance 12b, 13b, is disengaged, the torque in the system 4b, 14b, 54, 15b falls to zero, while the slip in the hydraulic coupling 2' drops and the system 4'b, 14'b, 15'b operates and rotates the worm shaft 16b. When the speed of the motor 1 is reduced and the clutch 12b, 13b, is re-engaged, the torque thereby restored in the system 4b, 14b, 54, 15b, assisted by friction opposes the torque in the system 4'b, 14'b, 15'b and thus causes the worm shaft 16b to come to rest.

Fig. 4 shows an arrangement somewhat similar to that in Fig. 3. The driving shaft 4c of the motor 1 is fixed to a bevel wheel 9c which drives co-axial bevel wheels 10c and 10'c continuously at equal speeds in opposite directions. The wheels 10c and 10'c are fixed respectively to shafts 11c and 11'c on which are slidably keyed friction clutch driving elements 12c and 12'c. Friction clutch driven elements 13c and 13'c are fixed to hollow shafts 56 and 56' which surround the shafts 11c and 11'c and to which are fixed respectively the impeller elements 2c and 2'c of two hydraulic couplings whose runners are fixed respectively to pinions 14c and 14'c journalled on the shafts 56 and 56'. These pinions mesh respectively with gear wheels 15c and 15'c fixed to the worm shaft 16c.

The arrangements shown in Figs. 3 and 4 do not provide a locking action for the driven member other than that due to the worm drive employed, since the hydraulic couplings are interposed in the parallel systems. For this reason the braking action, on re-engagement of either of the friction clutches, is cushioned by the hydraulic coupling in series therewith.

In the arrangements shown in Figs. 1 and 2, on the other hand, since there is no hydraulic coupling in the parallel systems, the driven member is locked mechanically by the friction clutches whenever they are both fully engaged.

Although in the drawings simple cone friction clutches are shown, it is to be understood that any suitable equivalent means may be used, such for example as an electro-magnetic friction clutch or a friction brake acting on an element of a planetary gear train, which brake can be disengaged to disconnect the drive through the train.

The electric driving motor with its shunt controller may be replaced by any suitable prime mover such as for example an internal-combustion engine or a steam turbine with appropriate speed-regulating gear.

I claim:

1. A reversing gear mechanism comprising a driving member adapted to rotate continuously in one direction, a driven member, and two friction clutches arranged in parallel with their driving elements connected to said driving member and their driven elements connected to said driven member, the arrangement being such that, when power is transmitted by the one or the other of said friction clutches, said driven member rotates in the one or the other direction respectively, characterised by the provision of two hydraulic couplings of the kinetic type, said couplings being connected respectively in series with said friction clutches while being arranged in parallel between said driving and driven members, and control means which normally maintain both of said friction clutches engaged, and which are operable to disengage said friction clutches alternatively.

2. A reversing gear mechanism comprising a driving member adapted to rotate continuously in one direction, a driven member, a forward-drive transmission system, a reverse-drive transmission system, said systems being connected in parallel between said driving and driven members and each including a hydraulic coupling of the kinetic type in series with a friction clutch, and control means which normally maintain both of said friction clutches engaged, and which are operable to disengage said friction clutches alternatively.

3. A reversing gear mechanism comprising a driving machine arranged to rotate continuously in one direction, a control member operable for varying the speed of said driving machine, a reversible driven member, and two friction clutches arranged in parallel with their driving elements connected to said driving member and their driven elements connected to said driven member, the arrangement being such that, when power is transmitted by the one or the other of said friction clutches, said driven member rotates in the one or the other direction respectively, characterised by the provision of at least one hydraulic coupling of the kinetic type connected between said driving member and said driven member in series with said friction clutches, said hydraulic coupling being in permanent driving connection with at least one of said friction clutches and common control means associated with said friction clutches and said speed control member, said control means being operable to disengage said friction clutches alternatively and to reduce the speed of said driving machine before re-engaging said clutches and thereby stalling said hydraulic coupling.

4. A reversing gear mechanism comprising a shunt-controlled electric motor, a shunt-regulator for controlling the speed of said motor, a reversible driven member, a forward-drive transmission system, a reverse-drive transmission system, said systems being connected in parallel between said motor and said driven member and each including a friction clutch, at least one hydraulic coupling of the kinetic type connected between said motor and said driven member in series with said friction clutches, said hydraulic coupling being in permanent driving connection with at least one of said friction clutches and a common control member associated with said shunt-regulator and said friction clutches, said control member serving, in one position, to maintain both of said clutches engaged and the speed of said motor low, and said control member being operable to disengage said clutches alternatively and to accelerate said motor to cause movement of said driven member in the one or the other direction respectively, and to retard said motor and thereafter to re-engage the disengaged clutch to arrest said driven member and stall said hydraulic coupling.

5. A reversing gear mechanism comprising a driving motor adapted to rotate continuously in one direction, a control member for varying the speed of said motor, a driven member, a hydraulic coupling of the kinetic type having an impeller element connected to said motor, and a runner element, a forward-drive transmission system, a reverse-drive transmission system, said systems being connected in parallel between said runner element and said driven member, and said systems each including a friction clutch having a driving element in permanent driving connection with said runner element, and common control means which are associated with said friction clutches and said speed-control member and which serve, when displaced to alternative positions, to disengage said clutches alternatively and to accelerate said motor, said control means being operable to arrest said driven member by retarding said motor and therafter re-engaging the one of said friction clutches that was disengaged while maintaining engagement of the other of said friction clutches.

6. A servo-controlled reversing gear comprising a reversible driven shaft, a driving motor adapted to rotate continuously in one direction, a forward-drive transmission system, a reverse-drive transmission system, said systems being connected in parallel between said motor and said driven shaft and each including a normally-engaged friction clutch, clutch-actuating means operable for disengaging said clutches alternatively, at least one hydraulic coupling of the kinetic type connected between said motor and said driven shaft in series with said friction clutches, a common control member, and a three-part differential device connecting said control member, said clutch-actuating means and said driven shaft, and serving, on displacement of said control member in the one or the other direction, first to disengage one or other of said friction clutches and thereafter to re-engage the disengaged clutch under the influence of the rotation of said driven shaft.

7. A servo-controlled reversing gear mechanism comprising a reversible driven shaft, a variable-speed driving motor adapted to rotate continuously in one direction, speed-control means associated with said motor, a forward-drive transmission system, a reverse-drive transmission system, said systems being connected in parallel between said motor and said driven shaft and each including a normally-engaged friction clutch, at least one hydraulic coupling of the kinetic type between said motor and said driven shaft in series with said friction clutches, a clutch-actuating member operable for disengaging said clutches alternatively and so connected to said speed-control means as to reduce the speed of said motor before rendering said clutches simultaneously engaged, a common control member, and a differential device having three parts connected respectively to said common control member, to said clutch-actuating member and to said driven shaft, said control member being operable to disengage said friction clutches alternatively, and said driven shaft operating through said differential device to re-engage the one of said clutches that is disengaged.

HAROLD SINCLAIR.